J. L. FIRM.

PRINTING PRESS.

No. 6,760. Reissued Nov. 23, 1875.

Witnesses:

Henry Gentner

Jacob Felbel

Inventor:

Joseph L. Firm by attorney

J. A. McCartney

N. PETERS, PHOTO-LITHOGRAPHER, WASHINGTON, D. C.

UNITED STATES PATENT OFFICE.

JOSEPH L. FIRM, OF NEW YORK, N. Y., ASSIGNOR OF ONE-HALF INTEREST TO CALVERT B. COTTRELL AND NATHAN BABCOCK.

IMPROVEMENT IN PRINTING-PRESSES.

Specification forming part of Letters Patent No. 146,441, dated January 13, 1874; reissue No. 6,760, dated November 23, 1875; application filed July 24, 1875.

*To all whom it may concern:*

Be it known that I, JOSEPH L. FIRM, of New York city, in the State of New York, have invented certain new and useful Improvements in Printing-Presses; and I do hereby declare that the following is a full and exact description thereof, reference being had to the accompanying drawings and to the letters of reference marked thereon.

My invention relates to certain new and useful improvements in printing, and in presses designed for printing on both sides of the sheet which passes through the machine; and my invention consists in the use, in combination with the usual impression-cylinder and flat form on a traveling bed, of a curved form and auxiliary impression-cylinder, the whole so arranged and operating together that the sheet fed into the machine will be first printed on one side, during its passage between the curved form and auxiliary impression-cylinder, and then pass directly onto the main impression-cylinder in such a position as to travel with it in contact with the usual flat form, and have its other side printed, "slip-sheets" being properly introduced between the said impression-cylinder and first printed side of the sheet, to avoid any "offset," all as will be hereinafter more fully described; and my invention further consists in feeding the slip-sheets used on the impression-cylinder directly to the gripers, instead of passing them first between carrying-tapes, whereby all liability of creasing and crinkling the slip-sheets is avoided, as will be hereinafter more particularly described; and my invention further consists in taking the slip-sheets away from the cylinder, by means of gripers, in lieu of leading them off by carrying-tapes, whereby less wear and tear of the slip-sheets occur, and the removal of the slip-sheets may be effected at different times, relatively to the rotations of the cylinder, as will be hereinafter described.

To enable those skilled in the art to make and use my invention, I will proceed to more fully explain its several features and the construction and mode of operation of a machine embracing the several features of my improvements.

Figure 1:
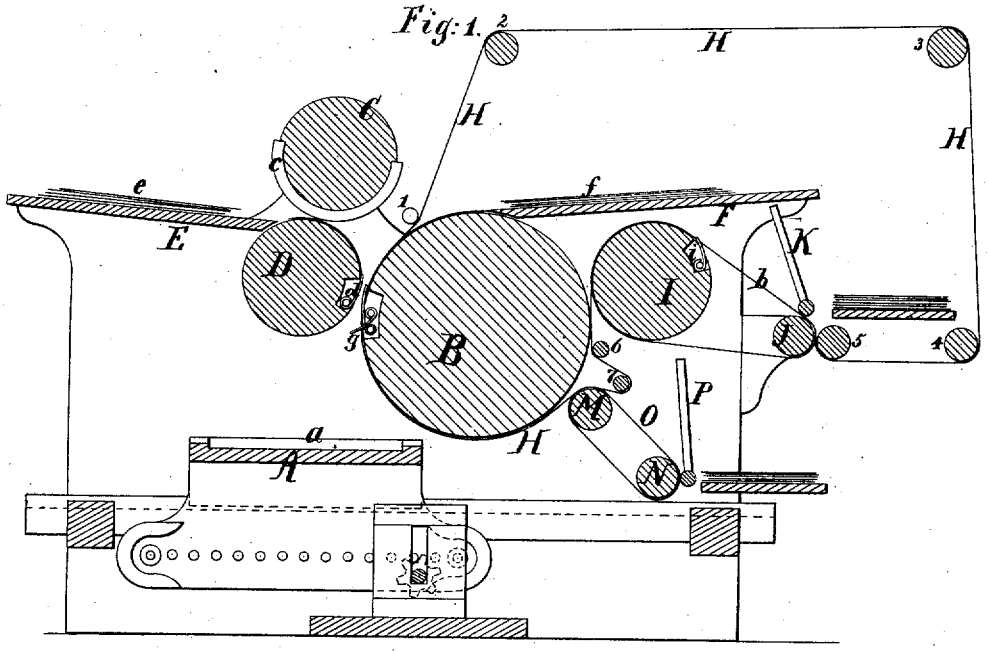
Figure 2:
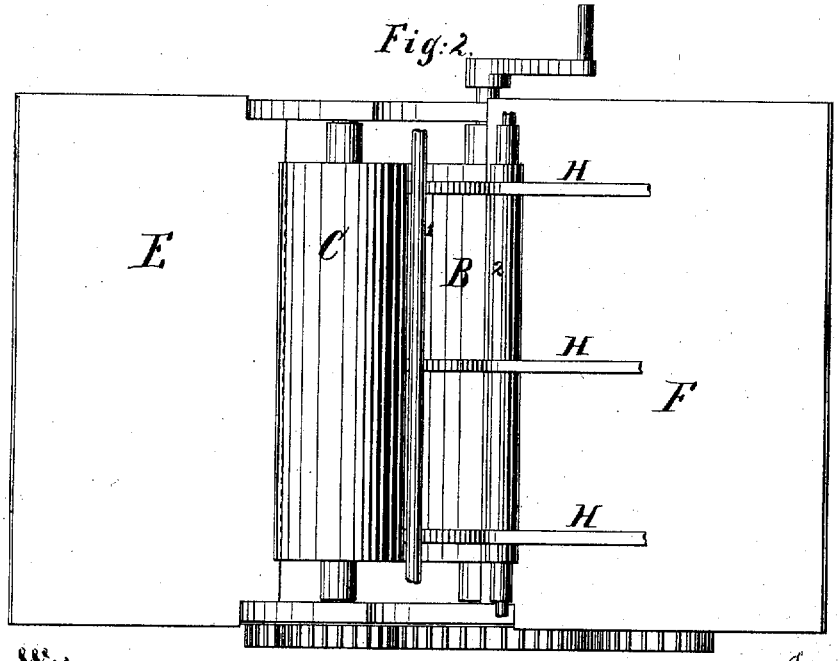

In the accompanying drawings, I have shown, in vertical longitudinal section at Fig. 1, and in top view at Fig. 2, so much of a printing-press as is necessary to fully illustrate my invention.

A represents the usual form-bed, and B the impression-cylinder of a printing-press, said cylinder and bed having the usual rotary and reciprocatory motions, respectively, and the latter carrying the ordinary flat form *a*. Some distance above the bed A, and adjacent to the impression-cylinder B, are arranged, as shown, close together, two cylinders, C and D, the first of which carries a curved form, *c*, while the latter is adapted to act in conjunction therewith as an impression-cylinder. E is the feed-board, from which the sheets of paper *e* to be printed are fed into the impression and form cylinders D C, of which D is provided with gripers *d*, such as are usually employed to take hold of the sheet fed to them, and carry it along with the cylinder. F is the slip-sheet feed-board, from which the slip-sheets *f* are fed to the impression-cylinder B. This cylinder is provided with the usual gripers *g*, and the slip-sheets *f* are fed directly from the board F to these gripers, in lieu of first passing along between carrying-tapes. H H represent the tapes which serve to hold the slip-sheets onto the face of the cylinder B until they are taken off by the gripers *i* of a griper-cylinder, I, over which, and a drum, J, pass auxiliary endless bands or tapes *b*, onto which the removed slip-sheets are passed, and from whence they are taken off on the fly K. The tapes H are carried around out of the way, and over and under the drums 1, 2, 3, 4, 5, J, I, 6, and 7, in the manner illustrated clearly in Fig. 1. M N are two drums, carrying the bands O, onto which the printed sheet is carried, and from whence it is removed in the usual manner by a fly, P.

The foregoing description of the several parts, their offices, and arrangement, together with the following brief explanation, will suffice to give a clear idea of the mode of operation of a machine constructed upon my improved plan.

The sheet of paper *e*, being fed to the gripers *d* of the impression-cylinders D as the lat-

BEST AVAILABLE COPY ter rotates in the direction indicated by the arrow thereon, is carried round with said cylinder, and in contact with the curved form *e* of type-cylinder C, and is printed on one side. While this operation of printing the sheet on one side is being thus performed a slip-sheet, *f*, is fed to one set of the gripers *g* of the main impression-cylinder B, and is carried round with said cylinder, and between its face and the tapes H, in such a manner and time that the advance edges of the sheet *e* and slip-sheet *f* will arive about simultaneously at the point where the impression-cylinders D and B are about tangential. Arrived here, and as the sheet *e* is leaving the form C, the other set of the gripers *g* take hold of the sheet *e* and carry it from the cylinder D to B with its printed surface in contact with the slip-sheet, to prevent any offset, there being, as seen, two sets of gripers on the main cylinder B, so that one set may hold and carry around the slip-sheet two or more times, irrespective of the action of the other set. The sheet *e* now passes along in contact with the flat form *a*, by which its other side is printed in the usual way, and thence between the tapes H and the periphery of drum M downward onto the bands O, from whence it is removed in usual manner, and printed on both sides by the fly P. As the printed sheet *e* passes over the drum M it parts company with the slip-sheet *f*, which latter travels on with the impression-cylinder B until it is taken therefrom by the gripers *i* of the griper-cylinder I, when it is carried along on top of the tapes *b*, and from them taken off by the fly K.

It will be understood that by a suitable means for regulating the operation of the mechanism actuating the gripers the machine may be set to either have the gripers *i* remove the slip-sheet during its first passage round with the impression-cylinder B, or to have them only operate after the slip-sheet shall have traveled round two or more times.

When it is remembered that the slip-sheet can just as well, with most kinds of work, be permitted to travel more than once, and that thereby the feeding of the slip-sheet is reduced to such slow work that it can be done by a slow hand, the advantage of thus permitting the slip-sheet to pass on round more than once, which it cannot do when it is carried off by tapes, will be appreciated.

The great advantage and importance of the removal of the slip-sheet (at any time) by a positive means or device, such as a griper, lies in the fact that by such positive means all possibility is avoided of a failure to take off the slip-sheet, and the great damage to the form that results from a slip-sheet getting displaced and crinkled up and traveling round in this condition, cannot occur.

Another advantage gained by the use of a griper-cylinder to take off the slip-sheets from the impression-cylinder is, that the sheets are not so much mutilated, and so soon rendered unfit for use, as when carried off and discharged by tapes passing over drums in the necessary manner.

It will be seen that by feeding the slip-sheets from the stack or table directly to the gripers of the impression-cylinder the sheet will be laid smooth and taut on the periphery of the cylinder, because it is drawn under some tension from the hands of the feeder by the gripers, while in the feeding in of the sheets by tapes prior to the take-hold of the gripers the sheet is liable to get creased and crinkled in the tapes, and will remain so to the great detriment of the work being done over it; and to the early destruction of the slip-sheet itself.

The most desirable results are accomplished by thus entering the slip-sheets directly into a positive take-hold device, such as a pair of gripers, in lieu of feeding or passing them into the machine by any such uncertain means as have heretofore been employed.

Having so fully explained the construction and operation of the several parts of my invention that those skilled in the art of building and using printing-presses can readily make and use my invention, what I claim as new, and desire to secure by Letters Patent, is—

1. The combination, with an impression-cylinder and reciprocating form, of an auxiliary impression-cylinder and curved form, the whole operating together to print both sides of the sheet during its passage through the machine, substantially as set forth.

2. The described method of placing the slip-sheets on the impression-cylinder—that is to say, by feeding them directly into the gripers of the impression-cylinder by hand.

3. The described method of removing the slip-sheets from the impression-cylinder after they shall have been used any desirable number of times, as hereinbefore set forth.

In testimony whereof I have hereunto set my hand and seal this 13th day of July, 1875.

JOSEPH L. FIRM. [L. S.]

In presence of—
J. N. McINTIRE,
JACOB FELBEL.

BEST AVAILABLE COPY